United States Patent
Lu et al.

(10) Patent No.: US 10,176,209 B2
(45) Date of Patent: Jan. 8, 2019

(54) ABORTABLE TRANSACTIONS USING VERSIONED TUPLE CACHE

(71) Applicant: VMware, Inc., Palo Alto, CA (US)

(72) Inventors: Yunshan Lu, San Jose, CA (US); Wenguang Wang, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 391 days.

(21) Appl. No.: 14/752,175

(22) Filed: Jun. 26, 2015

(65) Prior Publication Data

US 2016/0378815 A1   Dec. 29, 2016

(51) Int. Cl.
*G06F 12/02* (2006.01)
*G06F 17/30* (2006.01)
*G06F 12/0875* (2016.01)

(52) U.S. Cl.
CPC .... *G06F 17/30356* (2013.01); *G06F 12/0875* (2013.01); *G06F 17/30097* (2013.01); *G06F 17/30132* (2013.01); *G06F 17/30227* (2013.01); *G06F 17/30377* (2013.01); *G06F 2212/314* (2013.01); *G06F 2212/451* (2013.01)

(58) Field of Classification Search
None
See application file for complete search history.

(56) References Cited

U.S. PATENT DOCUMENTS

| 2015/0277966 A1* | 10/2015 | Sasaki | G06F 9/466 707/703 |
| 2015/0286671 A1* | 10/2015 | Ebiyama | G06F 17/30 707/692 |
| 2015/0347243 A1* | 12/2015 | Guerin | G06F 11/1471 709/212 |
| 2016/0328488 A1* | 11/2016 | Lytle | G06F 17/3056 |

\* cited by examiner

*Primary Examiner* — Charles Rones
*Assistant Examiner* — Ryan Dare
(74) *Attorney, Agent, or Firm* — Patterson & Sheridan, LLP

(57) ABSTRACT

A transaction manager for handling operations on data in a storage system provides a system for executing transactions that uses a versioned tuple cache to achieve fast, abortable transactions using a redo-only log. The transaction manager updates an in-memory key-value store and also attaches a transaction identifier to the tuple as a minor key. Opportunistic locking can be accomplished due to the low cost of aborting transactions.

15 Claims, 4 Drawing Sheets

ABORTABLE TRANSACTIONS USING VERSIONED TUPLE CACHE

BACKGROUND

Storage systems often use transactions to get atomic updates of on-disk data structures. For example, an update operation on a bitmap data structure to indicate certain blocks are now allocated and a write operation of the underlying blocks are performed atomically to ensure consistency of the storage system. Otherwise, if the storage system should crash or fail mid-operation, the storage system (specifically the bitmap and underlying data blocks) would be left in an inconsistent state. Isolation is another characteristic of storage systems, which ensures that concurrent (e.g., in parallel) execution of transactions results in a system state that would be obtained if the transactions were executed serially. Database systems have typically used data structures such as undo-redo logs to achieve isolation characteristics in relational database systems. However, because of the overhead incurred by undo-redo logs, file and storage systems have conventionally used redo-only logs to get fast transactions which cannot be aborted.

DETAILED DESCRIPTION

Embodiments of the present disclosure provides a system for executing transactions that uses a versioned tuple cache to achieve fast, abortable transactions using a redo-only log. Embodiments include a transaction manager that updates an in-memory key-value store and also attach a transaction identifier to the tuple as a major key. Unless a transaction is aborted, the transaction manager executes searches on the key-value store that ignores all tuples modified by un-committed transactions. The transaction manager may use a hash table of committed transactions and a maximal committed transaction identifier to determine whether a particular transaction has been committed. Accordingly, embodiments of the present disclosure enable opportunistic locking to be performed because the cost of aborting transactions is low compared to other approaches.

Figure 1:
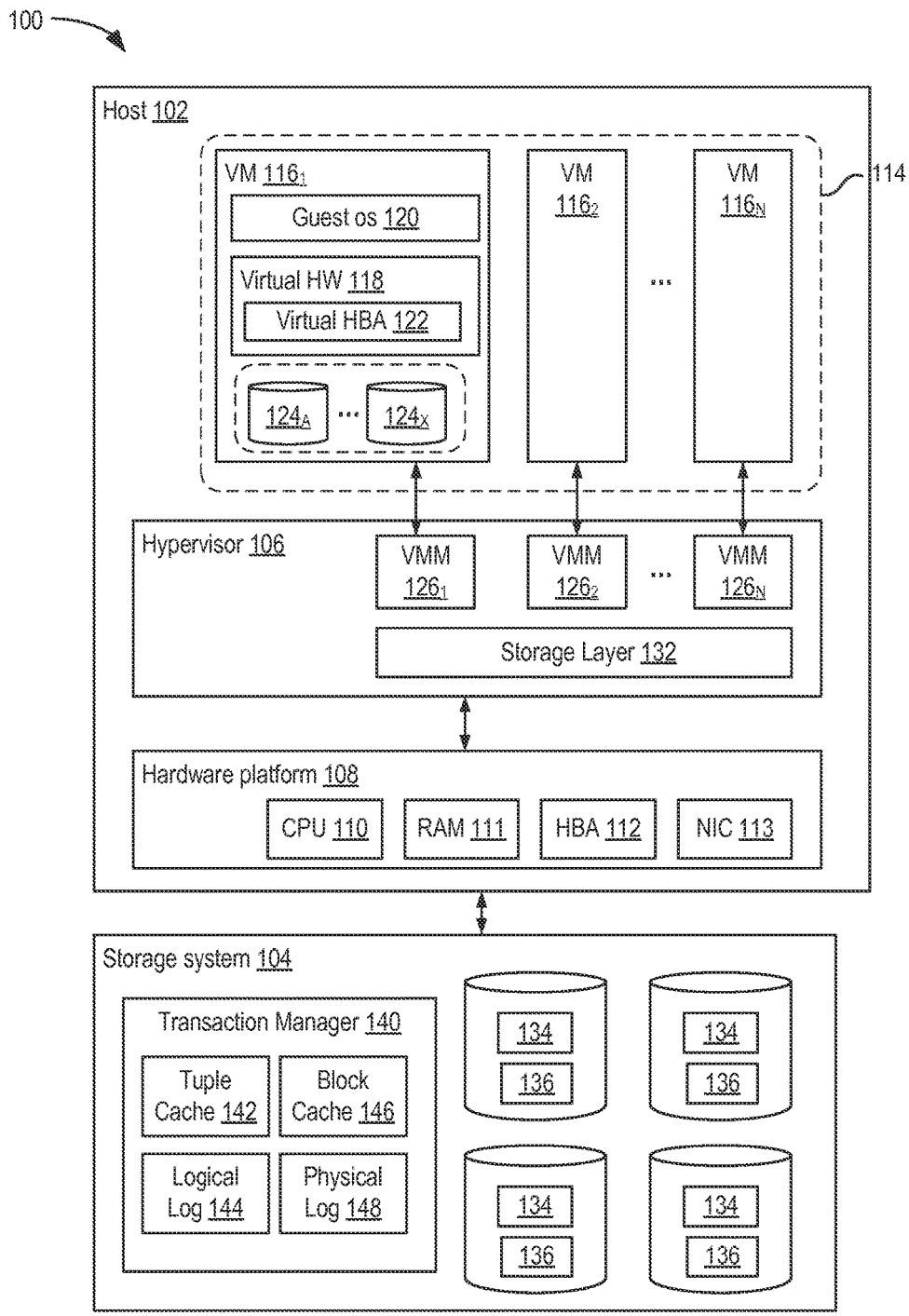
FIG. 1 is a block diagram that illustrates a computer system in which one or more embodiments may be utilized.

FIG. 1 is a block diagram that illustrates a computer system 100 according to one or more embodiments of the present disclosure. Computer system 100 includes one or more hosts 102 configured to provide a virtualization layer that abstracts processor, memory, storage, and networking resources of a hardware platform 108 into multiple virtual machines (VMs) 116 that run concurrently on the same host 102. VMs 116 run on top of a software interface layer, referred to as a hypervisor 106, that enables sharing of the hardware resources of host 102 by VMs 116. One example of hypervisor 106 is a VMware ESXi hypervisor provided as part of the VMware vSphere solution made commercially available from VMware, Inc. In some embodiments, storage system 104 may be implemented as software-define storage such as VMware Virtual SAN that clusters together server-attached hard disks and/or solid state drives (HDDs and/or SSDs), to create a flash-optimized, highly resilient shared datastore designed for virtual environments.

While embodiments are described in relation to a virtualized system, embodiments of the present disclosure can also be applied and/or extended to general filesystems and storage system layers.

Host 102 may comprise a general purpose computer system having one or more virtual machines accessing data stored on a storage system 104 communicatively connected to host 102. Host 102 may be constructed on a conventional, typically server-class, hardware platform 108. Hardware platform 108 of host 102 may include conventional physical components of a computing device, such as a processor (CPU) 110, a memory 111, a disk interface 112, and a network interface 113 card (NIC. Processor 110 is configured to execute instructions, for example, executable instructions that perform one or more operations described herein and may be stored in memory 111. Memory 111 and storage system 104 are devices allowing information, such as executable instructions, cryptographic keys, virtual disks, configurations, and other data, to be stored and retrieved. Memory 111 may include, for example, one or more random access memory (RAM) modules. Storage system 104 may include one or more locally attached storage devices, for example, one or more hard disks, flash memory modules, solid state disks, and optical disks. In some embodiments, storage system 104 may include a shared storage system having one or more storage arrays of any type such as a network-attached storage (NAS) or a block-based device over a storage area network (SAN). Disk interface 112, such as a host bus adapter (HBA), enables host 102 to communicate with a storage device, such as storage system 104, to store "virtual disks" that are accessed by VMs 116, as described later. Network interface 113 enables host 102 to communicate with another device via a communication medium, such as a communication network (not shown). An example of network interface 113 is a network adapter, also referred to as a Network Interface Card (NIC).

While storage system 104 is typically made up of a plurality of disks, other forms of storage, such as solid-state non-volatile storage devices, may be used, and the use of the term, "disk" herein, should therefore not be construed as limited only to rotating disk storage media, but may also be construed to encompass solid state disks, or "SSDs." In some embodiments, storage system 104 may be comprised of high-density non-volatile memory. Furthermore, while storage system 104 is depicted as a separate, external component to host 102, storage system 104 may be internal to host 102, for example, a local storage device or locally attached storage.

As shown in FIG. 1, a hypervisor 106 is installed on top of hardware platform 108 and supports a virtual machine execution space 114 within which multiple virtual machines (VMs) $116_1$-$116_N$ may be instantiated and executed. Each such virtual machine $116_1$-$116_N$ implements a virtual hardware platform 118 that supports the installation of a guest operating system (OS) 120 which is capable of executing one or more applications (not shown). Examples of a guest OS 120 include any of the well-known commodity operating systems, such as Microsoft Windows, Linux, and the like. In each instance, guest OS 120 includes a native file system layer, for example, either an NTFS or an ext3 type file system layer. These file system layers interface with virtual hardware platforms 118 to access, from the perspective of guest operating systems 120, a data storage HBA, which in reality, is virtual HBA 122 implemented by virtual hardware platform 118 that provides the appearance of disk storage support (in reality, virtual disks $124_A$-$124_X$) to enable execution of guest OS 120 transparent to the virtualization of the system hardware. A virtual disk 124 exposes the same abstraction as a real (physical) disk, that is, a linear list of sectors; however, a VMM may choose to implement virtual disks 124 as regular files on the host. Although, from the perspective of guest operating systems 120, file system calls initiated by such guest operating systems 120 to implement file system-related data transfer and control operations appear to be routed to virtual disks $124_A$-$124_X$ for final execution, in reality, such calls are processed and passed through virtual HBA 122 to adjunct virtual machine monitor (VMM) layers $126_1$-$126_N$ that implement the virtual system support needed to coordinate operation with hypervisor 106. In particular, a HBA emulator of each VMM 126 functionally enables the data transfer and control operations to be correctly handled by hypervisor 106 which ultimately passes such operations through its various layers to true hardware HBAs 112 or NIC 113 that connect to storage system 104.

Hypervisor 106 includes a storage layer 132 configured to manage storage space persistently for VMs 116 via VMM layers $126_1$ to $126_N$. In one embodiment, storage layer 132 may include numerous logical layers, such as an I/O virtualization layer, a file system driver, and a disk access layer. In some embodiments, the I/O virtualization layer receives a data transfer and control operation (in the form of I/O commands, for example, intended for a virtual disk) from VMM layers $126_1$ to $126_N$, and converts the operations into file system operations that are understood by a virtual machine file system (VMFS) driver in order to access a file stored in underlying storage under the management of the VMFS driver that represents virtual disk 124. The I/O virtualization layer then issues these file system operations to the VMFS driver. The VMFS driver, in general, manages creation, use, and deletion of files (e.g., such as .vmdk files representing virtual disks) stored on physical locations of, or in logical volumes or Logical Unit Numbers (LUNs) exposed by, storage system 104. The VMFS driver converts the file system operations received from the I/O virtualization layer to raw SCSI operations, which are issued to a data access layer that applies command queuing and scheduling policies to the raw SCSI operations and ultimately sends the raw SCSI operations to components of physical hardware platform 108. While storage layer 132 is depicted as part of a virtualized architecture, it should be recognized that embodiments of the present disclosure can be extended to other systems having a storage layer. For example, in an alternative embodiment, storage layer 132 may be a file system driver of an operating system that manages storage space persistently for locally attached storage.

It should be recognized that the various terms, layers and categorizations used to describe the virtualization components in FIG. 1 may be referred to differently without departing from their functionality or the spirit or scope of the invention. For example, VMMs 126 may be considered separate virtualization components between VMs 116 and hypervisor 106 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. In such an alternative conception, for example, the conceptual layer described as virtual hardware platform 118 may be merged with and into VMM 126 such that virtual host bus adapter 122 is removed from FIG. 1 (i.e., since its functionality is effectuated by a host bus adapter emulator within VMM 126).

Storage layer 132 maintains on-disk storage metadata 134 for facilitating the dynamic allocation of storage blocks 136 (sometimes referred to as disk blocks, disk sectors, or sectors) and other operations on storage system 104. For example, storage layer 132 is configured to receive and/or execute space allocation requests for storage blocks 136 that can used to handle requests to write data to storage system 104. In some embodiments, storage layer 132 uses storage metadata 134 for such tasks as remembering which storage blocks 136 are allocated and which storage blocks are free (e.g., bitmaps), or allowing quick random access to an arbitrary block in a particular file (e.g., b-trees).

Storage systems (e.g., storage system 104) often use transactions to get atomic updates of on-disk data structures (e.g., metadata 134, data blocks 136). For example, an update operation on a bitmap data structure to indicate certain blocks are now taken and a write operation of the underlying blocks are performed atomically to ensure consistency of the storage system. Otherwise, should the storage system crash or fail mid-operation, the storage system (specifically the bitmap and underlying data blocks) would be left in an inconsistent state.

Isolation is another characteristic of storage systems, which ensures that concurrent (e.g., in parallel) execution of transactions results in a system state that would be obtained if the transactions were executed serially. Database systems have typically used data structures such as undo-redo logs to achieve isolation characteristics in relational database systems. However, because of the overhead incurred by undo-redo logs, file and storage systems have conventionally used redo-only logs to get fast transactions which cannot be aborted.

Accordingly, embodiments of the present disclosure provides a system for executing transactions that uses a versioned tuple cache to achieve fast, abortable transactions using a redo-only log. In one or more embodiments, storage system 104 includes a transaction manager 140 configured to maintains a plurality of data structures including a tuple cache 142, a logical log 144, a block cache 146, and a physical log 148 for executing atomic, abortable transactions on data stored in storage system 104.

In one or more embodiments, storage system 104 includes a transaction manager 140 configured to update an in-memory key-value store and also attach a transaction identifier to the tuple as a major key. Before a transaction is aborted, transaction manager 140 is configured to execute searches on the key-value store that ignores all tuples modified by un-committed transactions. Transaction manager 140 is further configured to use a hash table of committed transactions and a maximal committed transaction identifier to determine whether a particular transaction has been committed. Accordingly, embodiments of the present disclosure enable opportunistic locking to be performed because the cost of aborting transactions is low compared to other approaches.

In one or more embodiments, transaction manager 140 is configured to convert I/O commands into key-value pairs that are written into tuple cache 142 and logical log 144 as intentions to operate on data. In one embodiment, tuple cache 142 is a versioned key-value store configured to store values representing I/O operations with transaction identifiers as keys. In some embodiments, tuple cache 142 may be maintained in-memory for high-performance and low-latency of operations. Upon committing a transaction, transaction manager 140 is configured to retrieve entries in tuple cache 142 and logical log 144 to be "replayed" and actually perform the operations on the data, as described herein. From a software perspective, operations for initiating a transaction, writing intentions to operate, and committing the transaction are illustrated in the pseudo-code provided in Table 1 below.

TABLE 1

```
tx = txCreate( );
btree_insert(tx, newkey1, newvalue1);
btree_insert(tx, newkey2, newvalue2);
btree_lookup(tx, newkey3);
btree_delete(tx, newkey2);
...
txCommit(tx);
```

In one embodiment, entries in logical log 142 include an operation specifying a particular I/O command, and one or more arguments specifying information needed to perform the I/O command. In one embodiment, entries in logical log 142 generally have the form of <transaction identifier>, <operation>, <argument(s)>, and may be variably-sized. Examples of I/O operations within logical log 142 are presented in Table 2 below. For example, logical log 142 may contain an entry indicating an insert operation for a <value> at a location <key> associated with the transaction identified by <txid>. In another example, logical log 142 may contain an entry indicating a delete operation for data stored at a location <key>, the operation being associated with the transaction identified by <txid>. In another example, logical log 142 may contain an entry specifying a space allocation (e.g., "alloc") or de-allocation (e.g., "free") operation for disk blocks.

TABLE 2

```
<txid>, insert, <key>, <value>
<txid>, delete, <key>
<txid>, alloc, <blkno>, <nblks>
<txid>, free, <blkno>, <nblks>
```

In one embodiment, physical log 148 contains a real physical representation of the blocks on disk (e.g., data). In contrast to logical log 144, physical log 148 has the property of idempotency such that operations in physical log 148 may be replayed repeatedly without changing the result beyond the intended state. Entries in physical log 148 may contain a transaction identifier, a physical log block number, actual data contents for the target block (e.g., to be written), and a logical log transaction identifier. The content of the target block may be arranged in a fixed size format (e.g., 4 kB, 8 kB). In one embodiment, entries in physical log 148 may have a form such as: <tx>, <plog-blkno>, <content of the block>, <llog-tx>.

Figure 2:
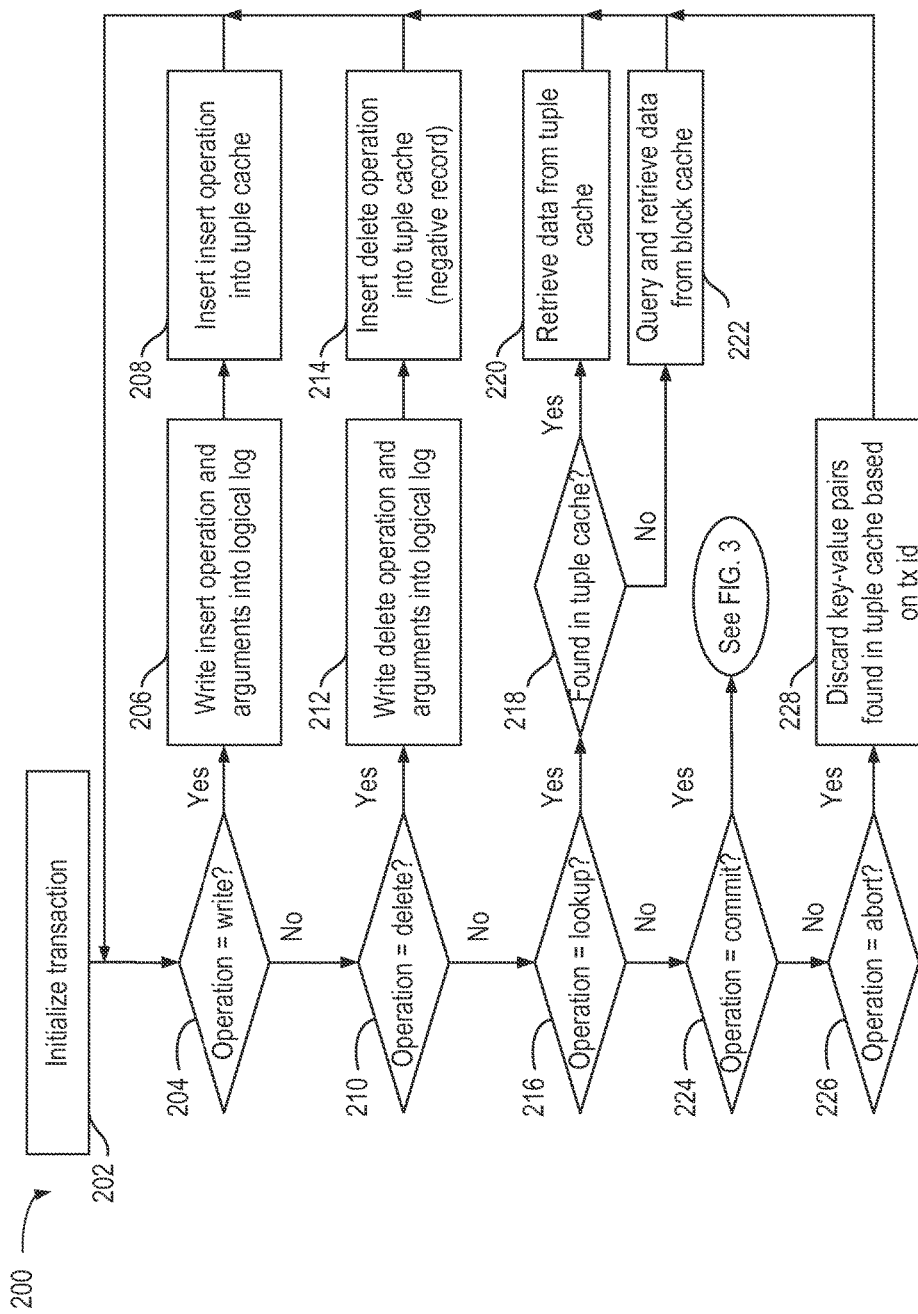
FIG. 2 is a flow diagram illustrating a method for executing transactions, according to one embodiment of the present disclosure.

FIG. 2 is a flow diagram illustrating a method 200 for executing transactions, according to one embodiment of the present disclosure. While method 200 is described in conjunction with the system shown in FIG. 1, it should be recognized that other systems may be used to perform the described methods.

Method 200 begins at step 202, where transaction manager 140 initializes a transaction on data stored in a storage device (e.g., storage system 104). Unlike conventional transaction systems using redo-only logs, the transaction is abortable by transaction manager 140, as described later. In some embodiments, transaction manager 140 initializes a transaction by generating a unique transaction identifier to be associated with any operations that are part of the new transaction. In one implementation, transaction manager 140 may initialize the transaction in response to a software call (e.g., txCreate( )).

After initializing the transaction, transaction manager 140 may receive one or more operations to be performed atomically as part of the transaction. For each operation, transaction manager 140 may, among other actions, insert into a versioned tuple cache 142 at least one key-value pair representing the operation. In some embodiments, the key-value pairs are indexed by a transaction identifier.

At step 204, transaction manager 140 determines whether the received operation is a write operation. If so, at step 206, responsive to a request to write data to storage system 104, transaction manager 140 writes an entry containing an insert operation and associated arguments (i.e., <insOp, arg>) into logical log 144. At step 208, transaction manager 140 inserts the insert operation into versioned tuple cache 142. In some embodiments, transaction manager 140 inserts a key-value pair where the key is the transaction identifier of the transaction and the value contains the insert operation and its associated arguments.

At step 210, transaction manager 140 determines whether the received operation is a delete operation. If so, at step 212, responsive to a request to delete data from storage system 104, transaction manager 140 writes a delete operation into logical log 144. In one implementation, transaction manager 140 writes an entry containing a delete operation and an argument indicating the location of the delete to be deleted (i.e., <delOp, arg>) into logical log 144. At step 214, transaction manager 140 inserts the delete operation into versioned tuple cache 142. In some embodiments, transaction manager 140 inserts a key-value pair where the key is the transaction identifier of the transaction and the value contains the delete operation and its associated argument(s). The delete operation represents a negative record indicating the deleted data no longer exists, without deleting underlying blocks from storage. That is, if tuple cache 142 is later queried for that data before the changes have been committed, tuple cache 142 can still report that the data has been deleted. Should the transaction be aborted, the negative record in tuple cache 142 can be discarded and other concurrent transactions can still reach that data, thereby achieving isolation storage characteristics.

At step 216, transaction manager 140 determines whether the received operation is a lookup operation. If so, at step 218, responsive to a request to look up data from storage system 104, transaction manager 140 first queries tuple cache 142 for the data. If found, at step 220, transaction manager 140 retrieves data from tuple cache 142 and returns the data in a response. Transaction manager 140 queries tuple cache 142 for any tuples that match the (logical) address of the data and that match the transaction identifier associated with the current transaction. In some embodiments, any lookup within a given transaction searches for data within tuples associated with the given transaction in tuple cache 142, ignoring tuples of other transactions, thereby providing isolation characteristic to the described technique. For example, a lookup for data block A in transaction X would ignore a tuple, which indicates the data block A has been deleted (i.e., negative record), stored in tuple cache 142 for a concurrent transaction Y. In effect, any lookup operation on tuple cache 142 will ignore all tuples modified by uncommitted transaction(s) of other thread(s).

Otherwise, at step 222, responsive to determining that the data is not found in the versioned tuple cache, transaction manager 140 queries block cache 146 for the data. In some embodiments, transaction manager 140 subsequently inserts an entry into tuple cache 142 with the data retrieved from block cache 146, so that tuple cache 142 can be used to retrieve that same data in subsequent lookup operations of the transaction.

At step 224, transaction manager 140 determines whether the received operation is a commit operation. If so, transaction manager 140 retrieve the key-value pairs from the versioned tuple cache using the transaction identifier, and applies the operations of the key-value pairs to block cache 146. In some embodiments, transaction manager 140 applies the operations of the key-value pairs to shadow pages of block cache 146, and applies changes to the shadow pages of block cache 146 if no conflicts. The commit operation is described in further detail in conjunction with FIG. 3.

At step 226, transaction manager 140 determines whether the received operation is an abort operation on the current transaction. If so, at step 228, responsive to a request to abort the transaction, transaction manager 140 discards all key-value pairs associated with the transaction from versioned tuple cache 142 based on the transaction identifier.

Figure 3:
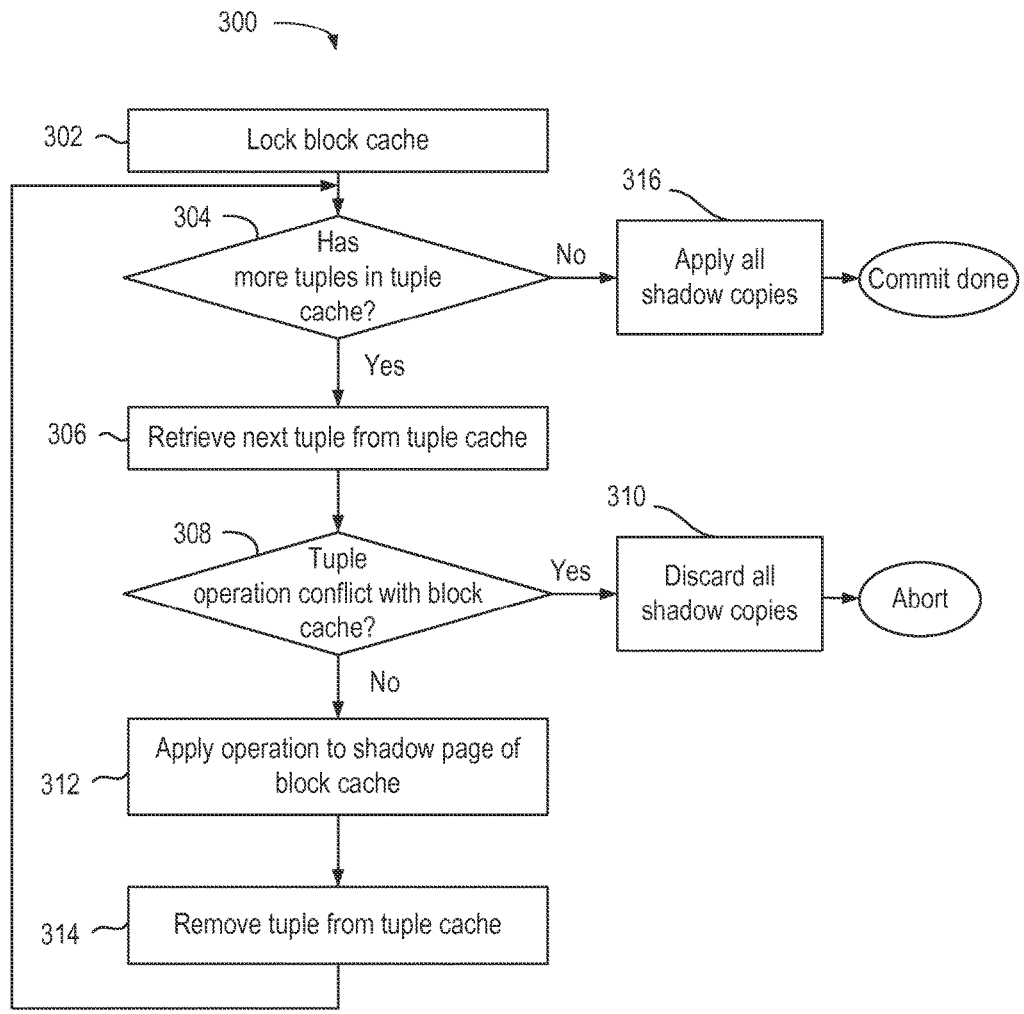
FIG. 3 is a flow diagram illustrating a method for committing a transaction, according to one embodiment of the present disclosure.

FIG. 3 is a flow diagram illustrating a method 300 for committing a transaction, according to one embodiment of the present disclosure. While method 300 is described in conjunction with the system shown in FIG. 1, it should be recognized that other systems may be used to perform the described methods.

Method 300 begins at step 302, where transaction manager 140 locks block cache 146. In some embodiments, transaction manager 140 locks the entirety of block cache 146 during method 300. In other embodiments, transaction manager 140 locks a portion of block cache 146 that will be affected by tuple operations, for example, according to a "preflight" check. In such an embodiment, transaction manager 140 scans the operations of the overall transaction and uses a hash table to find which portions of block cache 146 need to be locked.

In the described method, transaction manager 140 generally attempts to commit every tuple in tuple cache 142 associated with a given transaction in a loop. As such, in a loop condition, at step 304, transaction manager 140 determines whether there are more tuples of the particular transaction to be committed in tuple cache 142. If so, at step 306, transaction manager 140 retrieves a next tuple from tuple cache 142 of the particular transaction. In one implementation, transaction manager 140 can retrieve a next tuple using the transaction identifier associated with the transaction to be committed.

At step 308, transaction manager 140 determines whether the operation in the retrieved tuple conflicts with the state of block cache 146. The operation in the retrieved tuple is part of a current transaction might conflict with a prior and/or concurrent transaction. For example, the operation in the retrieved tuple may be a delete operation on a data block that has already been deleted by a prior transaction. In some embodiments, particularly embodiments where the transaction identifiers are generated as monotonically increasing, transaction manager 140 determines whether the current transaction conflicts with prior committed transactions according to a comparison of the transaction identifier. That is, transaction manager 140 can determine if the current transaction having a lower transaction identifier conflicts with a prior committed transaction having a higher transaction identifier. Such conflicts can arise in situations where one thread has a later-started but earlier-committed transaction than another concurrent thread. If so, at step 310, responsive to detecting a conflict, transaction manager 140 discards all shadow pages of block cache 146. Use of shadow pages are described further below. Subsequently, transaction manager 140 may reach an error state and abort the current transaction.

At step 312, responsive to determining the operation in the retrieved tuple does not conflict with the state of block cache 146, transaction manager 140 applies the operation to a shadow page of block cache 146. Shadow pages provide a copy-on-write technique where, instead of applying the operation to a target page in block cache 146 itself, a shadow page corresponding to that target page is allocated and the operation is applied to the shadow page. For example, responsive to an update operation on block A, transaction manager 140 allocates a shadow page A' and applies the update to shadow page A'. Use of the shadow pages permit the transaction manager 140 to discard any pending changes to block cache 146 in case of conflict or error (as in step 310 above) by simply discarding the shadow pages. At step 312, transaction manager 140 removes the tuple from the tuple cache, and proceeds to repeat steps 304 to 314.

Referring back to step 304, responsive to determining that there are no more tuples of the particular transaction to be committed in tuple cache 142 (and assuming no conflict has been detected), transaction manager 140 applies all shadow pages to block cache 146 itself. Transaction manager 140 may atomically swap all those blocks of the shadow pages with the corresponding blocks in block cache 146. That is, transaction manager 140 applies physical transactions onto the underlying data (e.g., B-tree data structure) itself. At such point, the particular transaction may be considered successfully committed and all operations of the transaction have been applied and persisted to storage system 104.

Figure 4:
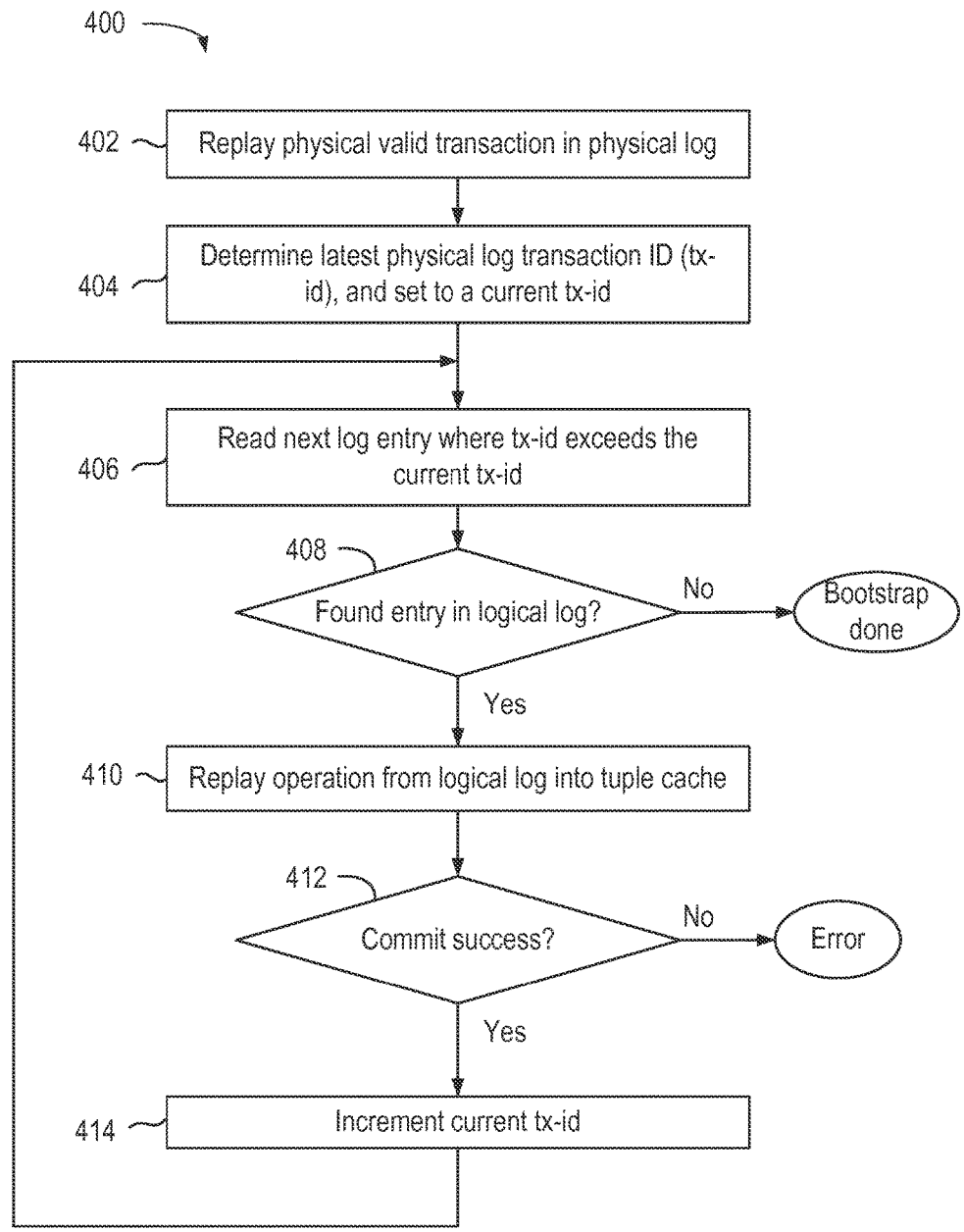
FIG. 4 is a flow diagram illustrating a method for bootstrapping a transaction manager, according to one embodiment of the present disclosure.

There may be cases where storage system 140 may suffer a failure or other interruption to its operations. As mentioned above, in such cases, storage system 140 is configured to bootstrap and recover from such failures using tuple cache 142 and logical log 144. FIG. 4 is a flow diagram illustrating a method 400 for bootstrapping transaction manager 140, according to one embodiment of the present disclosure. While method 400 is described in conjunction with the system shown in FIG. 1, it should be recognized that other systems may be used to perform the described methods.

Method 400 begins at step 402, where transaction manager 140 replays every valid physical transaction found within physical log 148 into tuple cache 142. In this context, a transaction is characterized as valid by having an entry with a "BEGIN" instruction and corresponding entry having a "COMMIT" instruction denoting the end of the transaction. An example physical log 148 is provided in Table 3 below. In this example, transaction manager 140 finds the BEGIN instruction having the transaction identifier "5" (i.e., "log_tx 5") and a corresponding COMMIT instruction having the same transaction identifier "5". As such, transaction manager 140 determines that the transaction "5 " is valid, and replays that transaction into tuple cache 142 by updating logical block 10 with content A. Further in this example, transaction manager 140 determines the second transaction having the transaction identifier "6 " is also valid, and replays that transaction 6 by writing logical blog 15 with content B in tuple cache 142. However, in the case of the transaction "7", transaction manager 140 determines that this transaction is not valid because while there is a BEGIN instruction, there is no corresponding COMMIT instruction found in physical log 148. Such a scenario may arise in cases where the system is interrupted or has failed in the middle of writing the transaction 7 to physical log 148.

TABLE 3

```
begin (log_tx5)
update (10, A, log_tx 5)
commit (log_tx5)
begin (log_tx6)
update (15, B13, log_tx 6)
commit (log_tx 6)
begin (log_tx7)
update (25, C, log_tx 7)
```

At step 404, transaction manager 140 determines a latest transaction identifier found within physical log 148 and designates this transaction identifier the "current" transaction identifier. In some embodiments, transaction manager 140 keeps track of the latest transaction identifier encountered while iterating through log entries in physical log 148 during course of replaying transactions in step 402. In the above example, the latest transaction identifier is transaction "6." This state represents that transaction manager 140 has successfully replayed every valid transaction up to transaction 6.

At step 406, transaction manager 140 attempts to reads a next log entry from logical log 144 having a "next" transaction identifier that exceeds the current transaction identifier. Continuing the above example scenario, at the outset of the bootstrap procedure, logical log 142 contains log entries for transactions identified 3 to 10. Transaction manager 140 attempts to read log entries in logical log 144 associated with transaction identifier "7" (i.e., 6+1). In this way, transaction manager 140 does not have to replay logical log entries for transactions 3, 4, 5, and 6.

At step 408, transaction manager 140 determines whether a corresponding log entry having that next transaction identifier can be found within logical log 144. If none found, transaction manager 140 may deem the bootstrap operation complete, and exit.

At step 410, responsive to finding a corresponding log entry in logical log 144, transaction manager 140 replays the operation contained in the corresponding log entry in logical log 144 into tuple cache 142. For example, transaction manager 140 replays the operation by inserting a key-value pair into tuple cache 142 that represents the operation, as described in method 200. At step 412, transaction manager 140 determines whether the operation was successfully replayed. If so, at step 414, transaction manager 140 increments the current transaction identifier and iterates to step 406 to read a next log entry from logical log 144, if needed, and continue method 400.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims.

Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. A method for executing a storage transaction, the method comprising:
    initializing a transaction on data stored in a storage device, wherein the transaction is abortable;
    inserting, into a versioned tuple cache, a plurality of key-value pairs, each of the plurality of key-value pairs representing a different one of a plurality of operations of the transaction, wherein a key of each of the plurality of key-value pairs is a transaction identifier of the transaction, and wherein at least one of the plurality of operations of the transaction comprises a request to abort the transaction comprising the transaction identifier;
    responsive to the request to abort the transaction comprising the transaction identifier:
        determining all the key-value pairs in the versioned tuple cache having a key equal to the transaction identifier; and
        discarding all the key-value pairs having the key equal to the transaction identifier from the versioned tuple cache; and responsive to a request to commit the transaction:
        retrieving the plurality of key-value pairs from the versioned tuple cache using the transaction identifier; and
        applying operations represented by the plurality of key-value pairs to a block cache.

2. The method of claim 1, wherein at one of the plurality of operations of the transaction comprises a request to write data to the storage device, and further comprising:
    responsive to the request to write data to the storage device:
        writing an insert operation into a logical log,
            wherein the insert operation is inserted into the versioned tuple cache as, one of the plurality of key-valued pairs.

3. The method of claim 1, wherein at least one of the plurality of operations of the transaction comprises a request to delete data from the storage device, and further comprising:
    responsive to the request to delete data from the storage device:
        writing a delete operation into a logical log,
            wherein the delete operation is inserted into the versioned tuple cache as one of the plurality of key-value pairs, wherein the delete operation represents a negative record indicating the deleted data no longer exists.

4. The method of claim 1, wherein at least one of the plurality of operations of the transaction comprises a request to look up data from the storage device, and further comprising:
    responsive to the request to look up data from the storage device:
        querying entries in the versioned tuple cache having the transaction identifier of the transaction for the data while ignoring entries in the versioned tuple cache having other transaction identifiers, and
        responsive to determining that the data is not found in the versioned tuple cache, querying the block cache for the data.

5. The method of claim 1, wherein applying the operations represented by the plurality of key-value pairs to the block cache further comprises:
    applying the operations represented by the plurality of key-value pairs to shadow pages of the block cache; and
    applying changes to the shadow pages of the block cache.

6. A non-transitory computer-readable storage medium comprising instructions that, when executed in a computing device, execute a storage transaction, by performing the steps of:
    initializing a transaction on data stored in a storage device, wherein the transaction is abortable;
    inserting, into a versioned tuple cache, a plurality of key-value pairs, each of the plurality of key-value pairs representing a different one of a plurality of operations of the transaction, wherein a key of each of the plurality of key-value pairs is a transaction identifier of the transaction, and wherein at least one of the plurality of operations of the transaction comprises a request to abort the transaction comprising the transaction identifier;
    responsive to the request to abort the transaction comprising the transaction identifier:
        determining all key-value pairs in the versioned tuple cache having a key equal to the transaction identifier; and
        discarding all the key-value pairs having the key equal to the transaction identifier from the versioned tuple cache; and
    responsive to a request to commit the transaction:
        retrieving the plurality of key-value pairs from the versioned tuple cache using the transaction identifier; and
        applying operations represented by the plurality of key-value pairs to a block cache.

7. The non-transitory computer-readable storage medium of claim 6, wherein at least one of the plurality of operations of the transaction comprises a request to write data to the storage device, and wherein the steps further comprise:
    responsive to the request to write data to the storage device:
        writing an insert operation into a logical log,
            wherein the insert operation is inserted into the versioned tuple cache as one of the plurality of key-value pairs.

8. The non-transitory computer-readable storage medium of claim 6, wherein at least one of the plurality of operations of the transaction comprises a request to delete data from the storage device, and wherein the steps further comprise:

responsive to the request to delete data from the storage device:
  writing a delete operation into a logical log,
    wherein the delete operation is inserted into the versioned tuple cache as one of the plurality of key-value pairs, wherein the delete operation represents a negative record indicating the deleted data no longer exists.

9. The non-transitory computer-readable storage medium of claim 6, wherein at least one of the plurality of operations of the transaction comprises a request to look up data from the storage device, and wherein the steps further comprise:
  responsive to the request to look up data from the storage device:
    querying entries in the versioned tuple cache having the transaction identifier of the transaction for the data while ignoring entries in the versioned tuple cache having other transaction identifiers, and
    responsive to determining that the data is not found in the versioned tuple cache, querying the block cache for the data.

10. The non-transitory computer-readable storage medium of claim 6, wherein the step of applying the operations represented by the plurality of key-value pairs to the block cache further comprises steps of:
  applying the operations represented by the plurality of key-value pairs to shadow pages of the block cache; and
  applying changes to the shadow pages of the block cache.

11. A computer system for allocating storage space, the computer system comprising:
  a storage device comprising a plurality of data blocks;
  a memory comprising a versioned tuple cache;
  a processor (CPU) configured to perform the steps of:
    initializing a transaction on data stored in the storage device, wherein the transaction is abortable;
    inserting, into the versioned tuple cache, a plurality of key-value pairs, each of the plurality of key-value pairs representing a different one of a plurality of operations of the transaction, wherein a key of each of the plurality of key-value pairs is a transaction identifier of the transaction, and wherein at least one of the plurality of operations of the transaction comprises a request to abort the transaction comprising the transaction identifier;
    responsive to the request to abort the transaction comprising the transaction identifier:
      determining all the key-value pairs in the versioned tuple cache having a key equal to the transaction identifier; and
      discarding all the key-value pairs having the key equal to the transaction identifier from the versioned tuple cache; and responsive to a request to commit the transaction:
      retrieving the plurality of key-value pairs from the versioned tuple cache using the transaction identifier; and
      applying operations represented by the plurality of key-value pairs to a block cache.

12. The computer system of claim 11, wherein at least one of the plurality of operations of the transaction comprises a request to write data to the storage device, and the processor is further configured to perform the steps of:
  responsive to the request to write data to the storage device:
    writing an insert operation into a logical log,
      wherein the insert operation is inserted into the versioned tuple cache as one of the plurality of a key-value pairs.

13. The computer system of claim 11, wherein at least one of the plurality of operations of the transaction comprises a request to delete data from the storage device, and the processor is further configured to perform the steps of:
  responsive to the request to delete data from the storage device:
    writing a delete operation into a logical log,
      wherein the delete operations is inserted into the versioned tuple cache as one of the plurality of key-value pairs, wherein the delete operation represents a negative record indicating the deleted data no longer exists.

14. The computer system of claim 11, wherein at least one of the plurality of operations of the transaction comprises a request to look up data from the storage device, and the processor is further configured to perform the steps of:
  responsive to the request to look up data from the storage device:
    querying entries in the versioned tuple cache having the transaction identifier of the transaction for the data while ignoring entries in the versioned tuple cache having other transaction identifiers, and
    responsive to determining that the data is not found in the versioned tuple cache, querying the block cache for the data.

15. The computer system of claim 11, wherein the processor configured to perform the step of applying the operations represented by the plurality of key-value pairs to the block cache is further configured to perform the steps of:
  applying the operations represented by the plurality of key-value pairs to shadow pages of the block cache; and
  applying changes to the shadow pages of the block cache.

* * * * *